June 23, 1970  M. E. WALLACE  3,517,145
PADDED STEERING WHEEL HORN SWITCH
Filed June 3, 1968  2 Sheets-Sheet 1

INVENTOR.
Marshall E. Wallace
BY
W.A. Schuetz
ATTORNEY

June 23, 1970      M. E. WALLACE      3,517,145
PADDED STEERING WHEEL HORN SWITCH
Filed June 3, 1968      2 Sheets-Sheet 2

INVENTOR.
Marshall E. Wallace
BY
W. A. Schuetz
ATTORNEY

United States Patent Office 3,517,145
Patented June 23, 1970

3,517,145
PADDED STEERING WHEEL HORN SWITCH
Marshall Eugene Wallace, Dayton, Ohio, assignor to General Motors Corporation, Detroit, Mich., a corporation of Delaware
Filed June 3, 1968, Ser. No. 733,907
Int. Cl. H01h 9/04
U.S. Cl. 200—61.55    3 Claims

ABSTRACT OF THE DISCLOSURE

In a preferred form, this disclosure relates to a combined steering wheel and horn switch assembly for an automotive vehicle. The steering wheel includes a hub portion which is adapted to be mounted on a steering column of the vehicle, an annular rim portion and radially extending spoke portions interconnecting the hub and rim portions. The horn switch comprises a support plate carried by the spoke portions and which is connected to a suitable ground, an actuating member disposed above the support plate and which is slidably connected thereto for movement toward and from the support plate, a plurality of spaced leaf springs connected to the support plate and engageable with the actuating member for biasing the same toward an outer position, and a cover made from a suitable elastomeric material for completely enclosing the other switch parts and for sealing the same from the ambient atmosphere. The leaf springs are connected in a circuit with an electrically actuatable horn and the cover is constructed in a manner such that it can be easily depressed at any location thereon to effect movement of the actuating member and adjacent leaf springs into engagement with the support plate to complete an electric circuit to actuate the horn.

---

The present invention relates to a steering wheel and horn switch assembly, and in particular to a padded steering wheel and horn switch assembly having a horn switch mechanism which is completely concealed from view and sealed from the ambient atmosphere.

Heretofore, steering wheels having padded center and radially extending spoke portions and horn switches disposed substantially beneath the padded areas have been provided. These known horn switches, however, included an actuating member having a portion thereof extending through an opening in the padding and which had to be depressed to actuate the electrically operated horn of the vehicle. While these known steering wheel and horn switch assemblies have been very successful in operation, they nevertheless have some drawbacks in that they are not completely concealed from view or sealed from the ambient atmosphere due to the clearance or gap required between the actuator portion and the opening in the padding.

The present invention is an improvement over these prior known types of padded steering wheel and horn switch assemblies in that the padded area completely encloses the horn switch mechanism so as to conceal the same from view and to seal the same from the ambient atmosphere. This prevents foreign material and moisture from entering the switching area and thus, corrosion of the switching elements is prevented or substantially prevented. Also, the aesthetic styling of the padded area is enhanced, since visible gaps between the actuator and the padding are eliminated and any possible spark flash that may occur when the switch mechanism is being actuated to blow the horn are concealed from view.

Accordingly, a general object of the present invention is to provide a new and improved padded steering wheel and horn switch assembly which is of a highly practical construction and in which the horn switch or horn switch mechanism is completely concealed from view and sealed from the ambient atmosphere.

Another object of the present invention is to provide a new and improved steering wheel and horn switch assembly in which the horn switch mechanism comprises a support member carried by the radially extending spoke portions of the steering wheel, an actuating member which is spring biased toward an outer position by springs carried by the support member and an elastomeric cover secured to the radially extending spoke portions and which completely encloses the switch mechanism, and in which the switch mechanism can be actuated by depressing the outer cover portion at any location thereon.

Yet another object of the present invention is to provide a new and improved steering wheel and horn switch assembly, as defined in the next preceding object, and in which the outer cover preferably includes lateral side portions having hinge means defined by sections of reduced thickness, the hinge means providing a pivot to enable the cover to be readily depressed with a minimum of force.

A further object of the present invention is to provide a new and improved steering wheel and horn switch assembly in which the cover has end portions which form an acute inclined angle with the top portion and a side portion whose upper and lower parts form an acute included angle so as to define hinge means about which the cover readily pivots when depressed.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals or characters are employed to designate corresponding parts throughout the several views, and in which.

Figure 1:
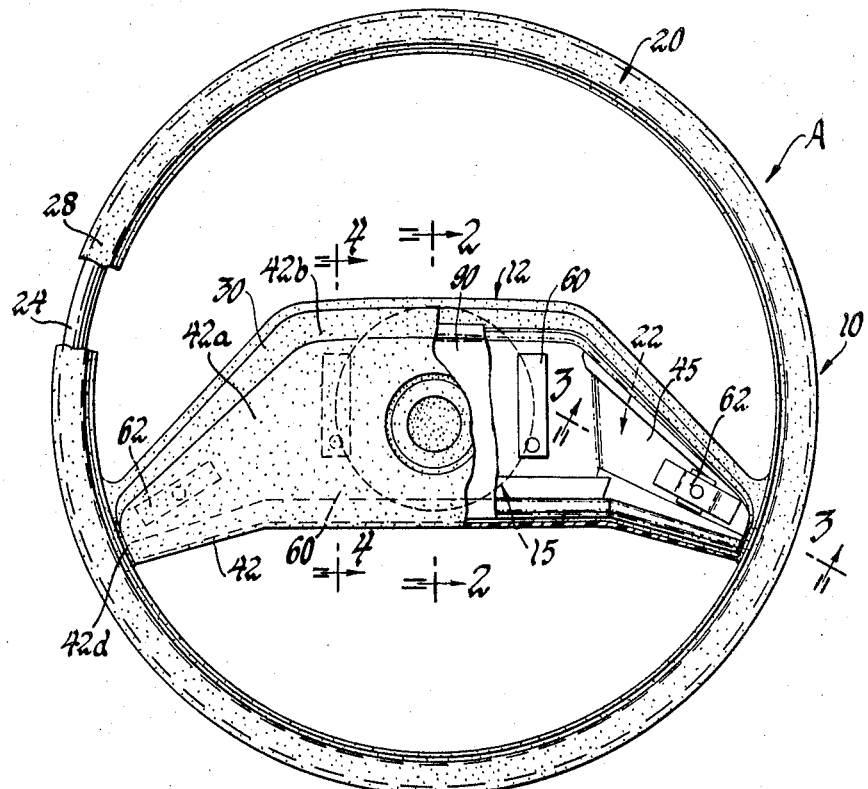
FIG. 1 is a top plan view with portions broken away of a preferred embodiment of the steering wheel and horn switch assembly of the present invention.

As representing a preferred embodiment of the present invention, FIG. 1 of the drawings shows a steering wheel and horn switch assembly A. The steering wheel and horn switch assembly A broadly comprises a steering wheel 10 and a horn switch or switch means 12 carried by the steering wheel 10 for controlling operation of an electrically actuatable horn 13 (shown schematically in FIG. 5) of an automotive vehicle (not shown). The horn switch 12 also provides a cushion or pad extending across the steering wheel 10 to protect the operator of the vehicle in the event he engages or is impact against this area of the steering wheel 10.

The steering wheel 10 comprises a hub or hub portion 15 having a metal inner ring 16 which is adapted to be splined to and mounted on a steering shaft or column 17 of the vehicle, and in any suitable or conventional manner. The steering wheel also comprises an outer ring or annular rim portion 20 which is adapted to be manually grasped by the operator of the vehicle for steering the latter and generally radially extending spoke portions 22 rigidly interconnecting the hub portion 15 with the rim portion 20.

Figure 3:
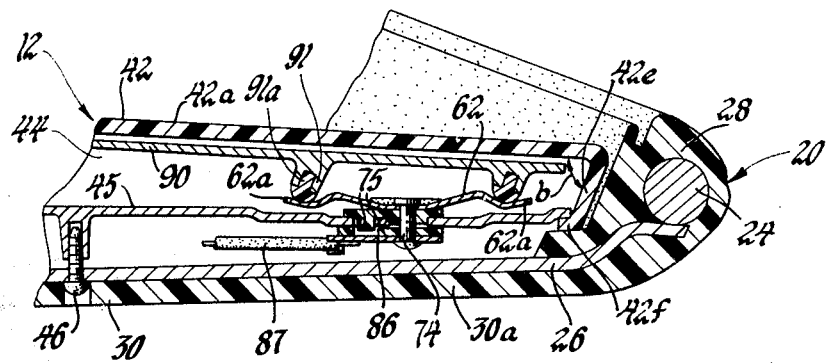
FIG. 3 is an enlarged fragmentary sectional view taken approximately along line 3—3 of FIG. 1.
Figure 4:
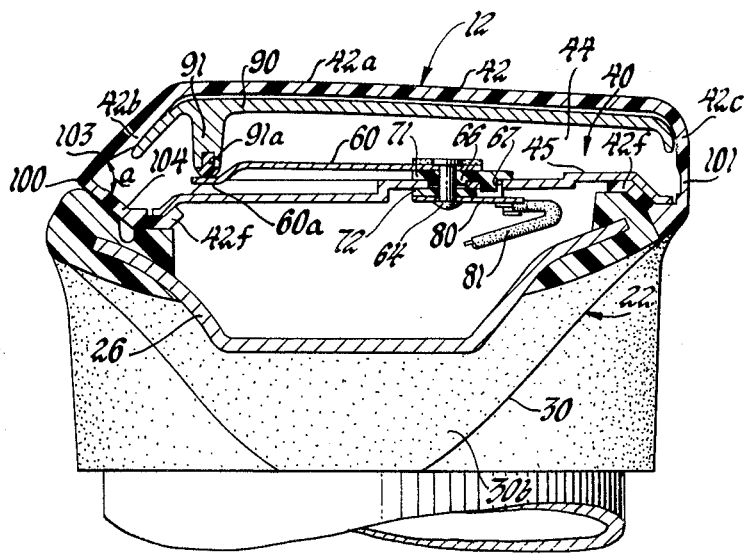
FIG. 4 is an enlarged fragmentary sectional view taken approximately along line 4—4 of FIG. 1.
Figure 5:
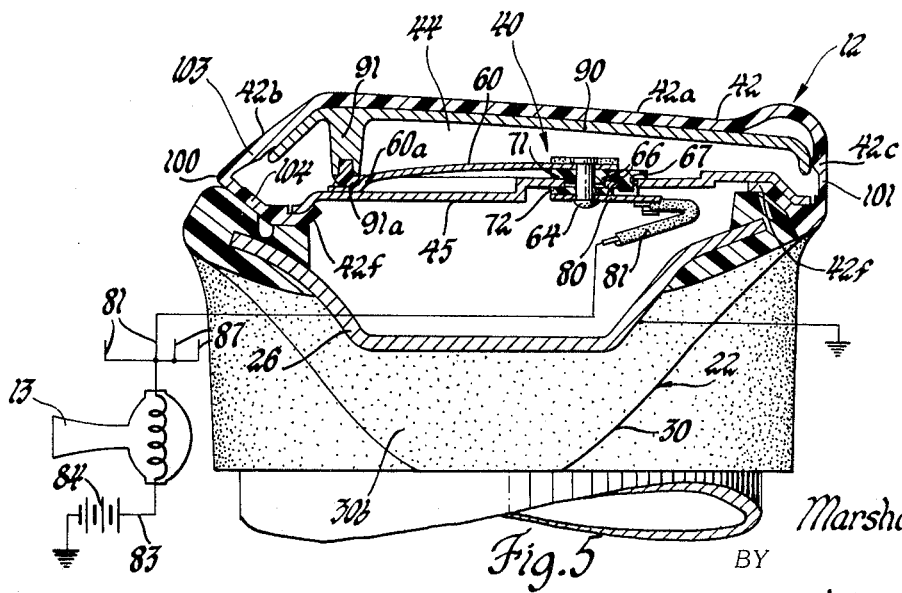
FIG. 5 is a view similar to that shown in FIG. 4, but showing certain parts thereof in different positions and showing a schematic electrical circuit diagram for actuating a horn.

As best shown in FIGS. 1 and 3, the rim portion 20 comprises an annular metal ring 24 which is rigidly secured, as by welding, to the opposite ends of a metal member 26 comprising part of the spoke portions 22. The metal member 26 at its mid-portion is also rigidly secured, as by welding, to the inner ring 16 of the hub portion 15. The annular metal ring 24 is embedded within an annular plastic sheath 28, the sheath 28 in turn being integral with a molding 30. The molding 30 has an annular portion 30a surrounding and rigidly secured to the inner ring 16 and radially extending portions 30b which surround the opposite lateral sides of the metal member 26 and extend therebeneath. The molding portions 30a and 30b respectively comprise part of the hub and spoke portions 15 and 22. As best shown in FIGS. 4 and 5, the radially extending spoke portions 22 are generally dish shaped, as viewed in transverse cross-section.

The horn switch 12 comprises a switch mechanism 40 carried by the hub and radially extending spoke portions 15 and 22 and which is completely enclosed by a cover 42 made from a suitable elastomeric material, such as vinyl. The cover 42 is generally crescent shaped, as viewed in plan, and extends across the steering wheel 10. The cover 42, in the preferred embodiment, comprises a top portion 42a, a pair of lateral side portions 42b and 42c, a pair of end portions 42d and 42e and an inwardly, peripherally extending bottom portion 42f. The peripherally extending bottom portion 42f is secured to the upwardly facing upper surfaces of the molding 30 in any suitable manner, such as by being bonded thereto. The cover 42 defines with the hub and radially extending spoke portions 15 and 22 an enclosed chamber 44 in which the switch mechanism 40 is disposed.

Figure 2:
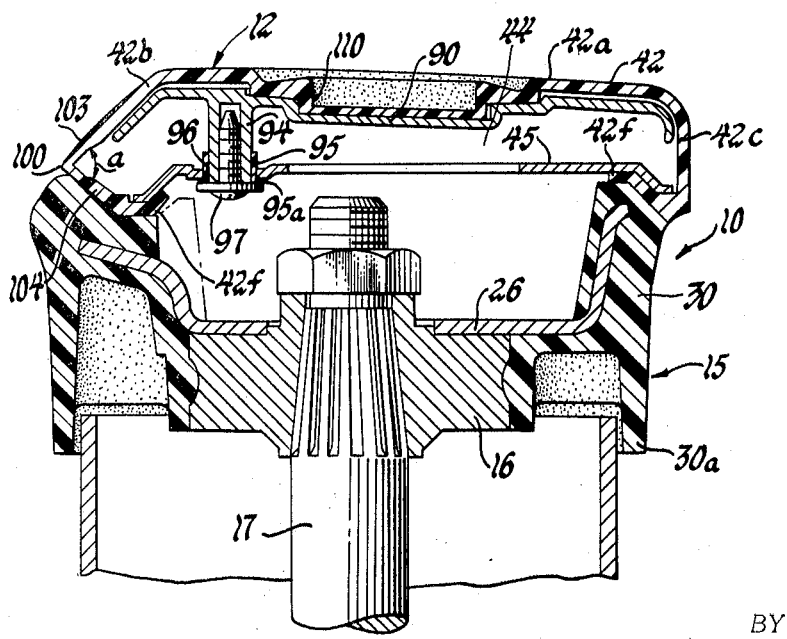
FIG. 2 is an enlarged fragmentary sectional view taken approximately along line 2—2 of FIG. 1.

The cover 42 is self-biased toward an outer position, as shown in FIGS. 2–4, and serves to completely conceal the switch mechanism 40 from view as well as to completely seal the chamber 44 from the ambient atmosphere and thus, prevent any foreign material or moisture from entering the chamber 44 and coming into contact with the switch mechanism 40.

The horn switch mechanism 40 comprises an elongated support plate 45 extending across the steering wheel 10 and which is supported by the hub and radially extending spoke portions 15 and 22 thereof. The support plate 45 has its opposite ends and side edges supported on the peripherally extending bottom portion 42f of the cover 42 and is held in place thereon or in clamping engagement therewith by being connected to the metal member 26 of the radially extending spoke portions 22 by suitable screws or bolts 46 at spaced locations therealong.

The support plate 45 carries a plurality of spaced leaf springs 60 and 62, the leaf springs 60, as best shown in FIG. 1, being disposed adjacent the hub portion 15 of the steering wheel 10 and the leaf springs 62 being disposed adjacent the rim portion 20 of the steering wheel 10. As shown in FIGS. 4 and 5, the leaf springs 60 at one end are each secured by a rivet 64 to a grommet means 66 made of a suitable electrically insulating material, the grommet means 66 in turn being disposed in an opening 67 in the support plate 45 and having flanges 71 and 72 in abutting engagement with the opposite sides of the plate 45 adjacent the opening 67 to securely connect the same to the support plate 45. The leaf springs 60 at their other ends 60a are free and are normally self-biased toward the position shown in FIG. 4 in which their free ends are spaced from the support plate 45.

The rivets 64 for connecting the leaf springs 60 to the grommet means 66 are also suitably secured to terminals 80, the terminals 80 in turn being secured to one end of suitable lead wires or conductors 81. The lead wires 81 are in parallel with each other and have their other ends electrically connected to the electrically actuatable horn 13, and in a manner well known to those skilled in the art. The horn 13 is also electrically connected via a lead wire or conductor 83 to one terminal of a battery 84, the other terminal of the battery being connected to a suitable ground. The support plate 45 is also connected to ground through the member 26 via the screws 46.

The leaf springs 62 adjacent the rim 20 of the steering wheel 10 are connected to and supported by the support plate 45 via rivets and grommet means 74 and 75, respectively, and in the same manner as that described for the leaf springs 60, except that the leaf springs 62 are connected intermediate their opposite free ends 62a to the support plate so as to provide a pair of free end portions 62a. Likewise, the rivets 74 are electrically connected with the horn 13 via terminals 86 and lead wires 87, and in the same manner as described above.

The horn switch mechanism 40 further comprises an actuating or horn blowing member 90 in the form of a flat, plate-like member coextensive with the top portion 42a of the cover 42. The actuating member 90 includes a plurality of spaced downwardly extending projections 91 for engaging the free ends 60a and 62a of the leaf springs 60 and 62. As best shown in FIGS. 3 and 4, the lower ends of each of the projections 91 includes a suitable insert 91a made of an electrically insulating material to electrically insulate the actuating member 90 from the leaf springs 60 and 62.

The actuating member 90 is also slidably connected to the support plate 45 for movement toward and from the support plate 45. To this end, the actuating member 90 is provided with a plurality of longitudinally spaced, downwardly extending, internally threaded bushings 94 (only one of which is shown—see FIG. 2) which are slidably received in sleeves or bushings 95 made from a suitable electrically insulating material, the sleeves 95 in turn being slidably received in aligned openings 96 in the support plate 45. The sleeves 95 each include a radially extending flange portion 95a disposed between the underside of the support plate 45 and the underside of a flanged head of a screw or bolt 97 threadably engaged with the internally threaded bushings 94. The sleeves 95 are slidably received within the openings 96 with a loose fit.

The actuating member 90 is normally biased to an outer position, as shown in FIGS. 3 and 4, by the leaf springs 60 and 62. In this position the actuating member 90 is in engagement with the inner side of the cover 42 and the leaf springs 60 and 62 are spaced from the support plate 45 and interrupt the conductive path to the support plate 45, which is connected to ground. Upward movement of the actuating member 90 from its outer position, as shown in FIGS. 3 and 4, is prevented as a result of the flange portion 95a of the sleeves 95 engaging the underside of the support plate 45.

When it is desired to actuate the horn 13 of the vehicle, the operator need merely depress the cover 42 at any location thereon in a downward direction toward the hub or spoke portions 15 and 22. As the cover 42 is depressed it causes the actuating member 90 to move in opposition to the biasing force of the adjacently located leaf spring or leaf springs 60 and/or 62, the actuating member 90 sliding downwardly relative to the support plate 45 due to the provision of the loose fit sliding connection therebetween. As the actuating member 90 is moved in the downward direction toward the support plate 45 it will move the adjacent leaf spring or springs into engagement with the support plate 45, which is connected to ground. When any of the leaf springs 60 or 62 engages the support plate 45, a circuit is completed to actuate the horn 13 to emit an audible sound. This circuit is from the battery, lead wire 83, horn 13, lead wire 81, terminal 80, rivet 64, leaf spring 60 and/or lead wire 87, terminal 86, rivet 74, leaf spring 62, support plate 45 to ground.

When actuation of the horn 13 is no longer desired, the operator will release the cover 42. The cover 42 will then return to its normal position, as shown in FIGS. 3 and 4, due to its self-biasing forces and the leaf spring or springs 60 and 62 will cause the actuating member 90 to be moved away from the support plate toward its outer position, as shown in FIGS. 3 and 4. When all of the leaf springs are disengaged from the support plate 45, the circuit to the horn 13 is interrupted and the horn is de-energized.

To reduce or minimize the force required to depress the cover 42, the opposite lateral side portions 42b and 42c of the cover include a hinge means or section 100 and 101, respectively. As best shown in FIGS. 4 and 5, the hinge means 100 and 101 comprise a section of the lateral side portions 42b and 42c which is of a reduced thickness as compared to the remaining adjacent sections of the side portions 42b and 42c. This provides a section of increased flexibility so that when the cover 42 is depressed, it will pivot or flex about this section in a hinge-like fashion. Moreover, it should also be noted that the lateral side portion 42b is generally V-shaped and with its upper and lower parts 103 and 104 being angularly related so as to define an acute included angle a therebetween. The apex of the angle a is at the reduced thickness section 100. This angular relationship further increases the flexibility or hinging action of the cover 42 and thereby further reduces or minimizes the force required to depress the cover 42.

Referring to FIG. 3, the end portions 42d and 42e are angularly related with respect to the top portion 42a of the cover so as to define an acute included angle b therebetween and with the apex of the angle defining a hinge means about which the top portion 42a pivots when the cover 42 is depressed adjacent these ends. The provision of the acute included angle here reduces or minimizes the force required to effect a depression of the top portion 42a of the cover 42 to effect movement of the leaf springs 62 into engagement with the support plate 45.

Although the horn switch mechanism 12 is shown as being provided with only two leaf springs 60 and two leaf springs 62, it will, of course, be understood that any suitable number of leaf springs could be employed. It should also be noted that the top cover portion 42a preferably includes a recessed portion 110 in its center at the hub portion 15 of the steering wheel in which a decorative escutcheon can be mounted.

As an alternative form, coil springs electrically insulated from the support plate 45 for biasing the actuating member 90 to its outer position could be employed in place of the leaf springs 60 and 62. In this form the inserts 91a in the projections 91 of the actuating member would be eliminated and the metal part of the actuator would be connected with the battery.

From the foregoing, it should be apparent that a novel steering wheel and horn switch assembly has been provided, and in which the horn of the vehicle can be actuated by depressing the cover 42 extending across the steering wheel 10 at any location thereon. It should also be apparent that the cover 42 completely encloses the switch mechanism to conceal the same from view and to seal the same from the ambient atmosphere so as to prevent foreign material and moisture from entering the switching area. Furthermore, it should be apparent that cover 42 in conjunction with the actuating member 90 and leaf springs 60 and 62 provide a pad or cushion extending across the steering wheel 10.

Although the preferred embodiment hereof has been described in great detail, it should be apparent that certain modifications, changes, and adaptations may be made in the illustrated, preferred embodiment, and that it is intended to cover all such modifications, changes and adaptations which come within the scope of the appended claims.

What is claimed is:

1. In combination with a steering wheel having a hub portion which is adapted to be mounted on a steering column of a vehicle, a rim portion which is adapted to be grasped by an operator of the vehicle and radially extending spoke portions interconnecting said hub and rim portions, a horn switch means for controlling actuation of a horn on the vehicle, said horn switch means comprising: an imperforate cover made from a relatively thin elastomeric material and having a top portion, lateral side portions, end portions and a bottom portion, said bottom portion being secured to said radially extending spoke portions of said steering wheel and said cover defining with said spoke and hub portions an enclosed chamber sealed from the ambient atmosphere; said cover being self-biased toward an outer normal position; support means supported by said spoke portions; an actuating member spaced from said support means and engageable with the inner side of and generally coextensive with said upper portion of said cover member; a plurality of spaced spring members carried by said support means and engageable with said actuating member for biasing the latter toward an outer position in which it is not engaged with said support means; means for electrically insulating said spring members from said support means; one of said members and said support means being in an electric circuit with an electrically actuatable horn and with the circuit being interrupted when said actuating member is in its outer position, said actuating member being movable in opposition to the biasing forces of the spring members from its outer position into engagement with said support means to provide a conductive path between one of said members and said support means to actuate the horn in response to said cover being depressed at any location on its top portion, said side portions of said cover including a section of reduced thickness to provide a hinge means about which said cover readily flexes upon being depressed.

2. In combination with a steering wheel having a hub portion which is adapted to be mounted on a steering column of a vehicle, a rim portion which is adapted to be grasped by an operator of the vehicle and radially extending spoke portions interconnecting said hub and rim portions, a horn switch means for controlling actuation of an electrically operated horn on the vehicle, said horn switch means comprising: an imperforate cover made from an elastomeric material and having a top portion, lateral side portions, end portions and a bottom portion, said bottom portions being secured to said steering wheel and said cover defining with said spoke and hub portions an enclosed chamber sealed from the atmosphere ambient thereto, said cover being self-biased toward an outer normal position, support means supported by said spoke portions; an actuating member spaced from said support means and engageable with the inner side of and generally coextensive with said upper portion of said cover member; a plurality of spaced spring members carried by said support means and engageable with said actuating member for biasing the latter toward an outer position in which it is not engaged with the support means; means for electrically insulating said spring members from said support means; one of said members and said support means being adapted to be connected in an electric circuit with an electrically actuated horn and with the circuit being interrupted when said actuating member is in its outer position, said actuating member being movable in opposition to the biasing forces of the spring members from its outer position into engagement with said support means to provide a conductive path between one of said members and said support means to actuate the horn in response to said cover being depressed at any location thereon, one of said side portions of said cover member having upper and lower parts which are angularly related with respect to each other so as to define an acute included angle therebetween and a hinge at the apex of the included angle, said hinge providing a line about which said cover readily flexes upon being depressed, said end portions also being angularly related to said top portion to define an acute included angle therebetween to provide a hinge at the apex of the included angle.

3. A combined steering wheel and horn switch assembly comprising: a steering wheel having a hub portion which is adapted to be mounted on a steering column of a vehicle, a rim portion which is adapted to be grasped by the operator of the vehicle and radially extending spoke portions interconnecting said hub and rim portions, a horn switch for controlling actuation of a horn of the vehicle, said horn switch comprising an imperforate cover made from a relatively thin elastomeric material and having a top portion, lateral side portions, end portions and a bottom portion, said bottom portion being secured to upwardly facing surfaces on said radially extending spoke portions of said steering wheel and said cover defining with said spoke and hub portions an enclosed chamber sealed from the atmosphere ambient thereto, said cover being self-biased toward an outer normal position, a support plate supported by said radially extending spoke portions and being substantially coextensive therewith and electrically connected to ground, an actuating member generally coextensive with the top portion of said cover member and slidably supported by said support plate for movement relative thereto, said actuating member being engageable with the inner surface of said upper and side portions, said actuating member having a plurality of downwardly extending projections at spaced locations therealong, a plurality of leaf springs carried by said support plate at spaced locations thereon and with some of the leaf springs being located adjacent the hub portion and others being located adjacent the rim portion, means for connecting said leaf spring to said support plate and for electrically insulating said leaf springs from the support plate, said leaf springs having their other free ends engageable with one of the downwardly extending projections of the actuating member and biasing said actuating member towards an outer position in which the projections are spaced from the support plate, said leaf springs being adapted to be electrically connected in a circuit with said electrically operated horn; said actuating member being movable from its outer position in opposition to the biasing forces of the leaf springs to move the latter into engagement with the support plate to provide a conductive path between the leaf springs and the support plate to actuate the horn in response to said cover being depressed at any location on its outer surface, said lateral side portions of said cover being angularly related to the adjacent bottom portion thereof so as to define an acute included angle therebetween and a hinge at the apex of the angle about which said cover readily pivots upon its outer surface being depressed, said side portion also having a thickness at the hinge which is less than the thickness of the remaining portions thereof.

References Cited

UNITED STATES PATENTS

| | | | |
|---|---|---|---|
| 2,227,250 | 12/1940 | Dirrig | 200—61.55 |
| 2,361,630 | 10/1944 | Jacobi | 200—61.57 X |
| 2,812,402 | 11/1957 | Dixon. | |
| 2,823,279 | 2/1958 | Schulenburg | 200—86 |
| 2,922,003 | 1/1960 | Roscoe | 200—86 |
| 3,246,112 | 4/1966 | Adams et al. | |

FOREIGN PATENTS

| | | |
|---|---|---|
| 610,654 | 10/1960 | Italy. |
| 1,196,690 | 11/1959 | France. |

ROBERT K. SCHAEFER, Primary Examiner

R. A. VANDERHYE, Assistant Examiner

U.S. Cl. X.R.
200—61.57, 168